United States Patent
Kai

(10) Patent No.: US 11,108,919 B2
(45) Date of Patent: Aug. 31, 2021

(54) IMAGE PROCESSING APPARATUS AND METHOD FOR CONFIGURING COMMUNICATION SETTINGS

(71) Applicant: BROTHER KOGYO KABUSHIKI KAISHA, Nagoya (JP)

(72) Inventor: Takafumi Kai, Aichi (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 16/368,938

(22) Filed: Mar. 29, 2019

(65) Prior Publication Data

US 2019/0306332 A1    Oct. 3, 2019

(30) Foreign Application Priority Data

Mar. 30, 2018 (JP) .............................. JP2018-067380

(51) Int. Cl.
*G06F 15/00* (2006.01)
*H04N 1/00* (2006.01)
(Continued)

(52) U.S. Cl.
CPC ..... *H04N 1/00214* (2013.01); *H04L 41/0803* (2013.01); *H04L 41/0869* (2013.01);
(Continued)

(58) Field of Classification Search
CPC ....... H04N 1/00214; H04N 2201/0039; H04N 2201/0041; H04N 2201/0049;
(Continued)

(56) References Cited

U.S. PATENT DOCUMENTS

2006/0034234 A1   2/2006  Watanabe
2012/0331202 A1*  12/2012 Cohen ................... G06F 13/102
                                                710/313
2014/0063537 A1*  3/2014  Nishikawa .............. H04L 69/18
                                                358/1.15

FOREIGN PATENT DOCUMENTS

JP          2006-054577 A      2/2006

* cited by examiner

*Primary Examiner* — Mark R Milia
(74) *Attorney, Agent, or Firm* — Scully, Scott, Murphy & Presser, P.C.

(57) ABSTRACT

An image processing apparatus, which complies with a particular setting protocol including a procedure to receive setting information for a first communication system from an OS of an information processing device, includes a first communication interface for a first communication system, a second communication interface for a second communication system, and a controller configured to transmit, to the information processing device via the second communication interface, compliance information representing that the image processing apparatus complies with the particular setting protocol, after sharing mutual compliance recognition with the information processing device through transmitting the compliance information, receive the setting information from the OS via the second communication interface in accordance with the particular setting protocol, the mutual compliance recognition being recognition that the image processing apparatus and the OS comply with the particular setting protocol, and configure settings for the first communication system based on the setting information.

20 Claims, 12 Drawing Sheets

(51) Int. Cl.
   *H04W 76/10*   (2018.01)
   *H04L 12/24*   (2006.01)
   *H04W 84/12*   (2009.01)
(52) U.S. Cl.
   CPC .... *H04W 76/10* (2018.02); *H04N 2201/0039* (2013.01); *H04N 2201/0041* (2013.01); *H04N 2201/0049* (2013.01); *H04N 2201/0055* (2013.01); *H04W 84/12* (2013.01)
(58) Field of Classification Search
   CPC ........... H04N 2201/0055; H04W 76/10; H04L 41/0803; H04L 41/0869
   USPC ....................................................... 358/1.15
   See application file for complete search history.

IMAGE PROCESSING APPARATUS AND METHOD FOR CONFIGURING COMMUNICATION SETTINGS

CROSS-REFERENCE TO RELATED APPLICATION

This application claims priority under 35 U.S.C. § 119 from Japanese Patent Application No. 2018-067380 filed on Mar. 30, 2018. The entire subject matter of the application is incorporated herein by reference.

BACKGROUND

Technical Field

Aspects of the present disclosure are related to an image processing apparatus having a communication function, more particularly, to a technology for configuring communication settings for the image processing apparatus.

Related Art

Technologies have been known for configuring various communication settings such as authentication information for an image processing apparatus (e.g., a printer and an image scanner) to communicate with another device in a particular communication system. For instance, a technology has been disclosed in which when an information processing device and an image processing apparatus are communicably interconnected in a wired manner, the information processing device wirelessly connected with an access point sets parameters concerning wireless communication for the image processing apparatus, then acquires identification information of the image processing apparatus, and further transmits the acquired identification information to the access point. Thus, after receiving the identification information of the image processing apparatus from the information processing device, the access point establishes a wireless connection with the image processing apparatus based on the received identification information.

SUMMARY

In order to put the disclosed technology into practice, there is a need to execute an application program for configuring communication settings, which may be provided by a manufacturer or a vendor of the image processing apparatus. Thus, a user is required to perform troublesome operations for installing the application program.

Aspects of the present disclosure are advantageous to provide one or more improved techniques for reducing troublesome operations for configuring communication settings for an image processing apparatus to perform communication in a particular communication system.

According to aspects of the present disclosure, an image processing apparatus is provided, which includes a first communication interface configured to perform communication in a first communication system, a second communication interface configured to perform communication in a second communication system different from the first communication system, and a controller configured to perform a setting process to establish a connection with an information processing device via the first communication interface. The image processing apparatus complies with a particular setting protocol including a procedure to receive setting information for the first communication system from an OS of the information processing device. The setting process includes transmitting compliance information to the information processing device via the second communication interface, the compliance information representing that the image processing apparatus complies with the particular setting protocol, after sharing mutual compliance recognition with the information processing device through transmitting the compliance information, receiving the setting information from the OS of the information processing device via the second communication interface in accordance with the particular setting protocol, the mutual compliance recognition being mutual recognition that both the image processing apparatus and the OS of the information processing device comply with the particular setting protocol, and based on the setting information received from the OS of the information processing device, configuring settings for the first communication system.

According to aspects of the present disclosure, further provided is an image processing apparatus including a first communication interface configured to perform communication in a first communication system, a second communication interface configured to perform communication in a second communication system different from the first communication system, and a controller configured to perform a setting process to establish a connection with an information processing device via the first communication interface. The image processing apparatus complies with a particular setting protocol including a procedure to receive setting information for the first communication system from an OS of the information processing device. The setting process includes transmitting a request for setting information for the first communication system, to the information processing device via the second communication interface, in response to transmitting the request for the setting information, receiving the setting information from the OS of the information processing device via the second communication interface in accordance with the particular setting protocol, and based on the setting information received from the OS of the information processing device, configuring the settings for the first communication system.

According to aspects of the present disclosure, further provided is a method implementable on a controller of an image processing apparatus including a first communication interface configured to perform communication in a first communication system, and a second communication interface configured to perform communication in a second communication system different from the first communication system. The image processing apparatus complies with a particular setting protocol including a procedure to receive setting information for the first communication system from an OS of an information processing device. The method includes transmitting compliance information to the information processing device via the second communication interface, the compliance information representing that the image processing apparatus complies with the particular setting protocol, after sharing mutual compliance recognition with the information processing device through transmitting the compliance information, receiving the setting information from the OS of the information processing device via the second communication interface in accordance with the particular setting protocol, the mutual compliance recognition being mutual recognition that both the image processing apparatus and the OS of the information processing device comply with the particular setting protocol, and based on the setting information received from the OS of the information processing device, configuring settings for the first communication system.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, illustrative embodiments according to aspects of the present disclosure will be described with reference to the accompanying drawings.

First Illustrative Embodiment

In a first illustrative embodiment, aspects of the present disclosure are applied to a printing system including one or more image forming apparatuses and one or more information processing devices that are communicably connected with each other.

Figure 1:
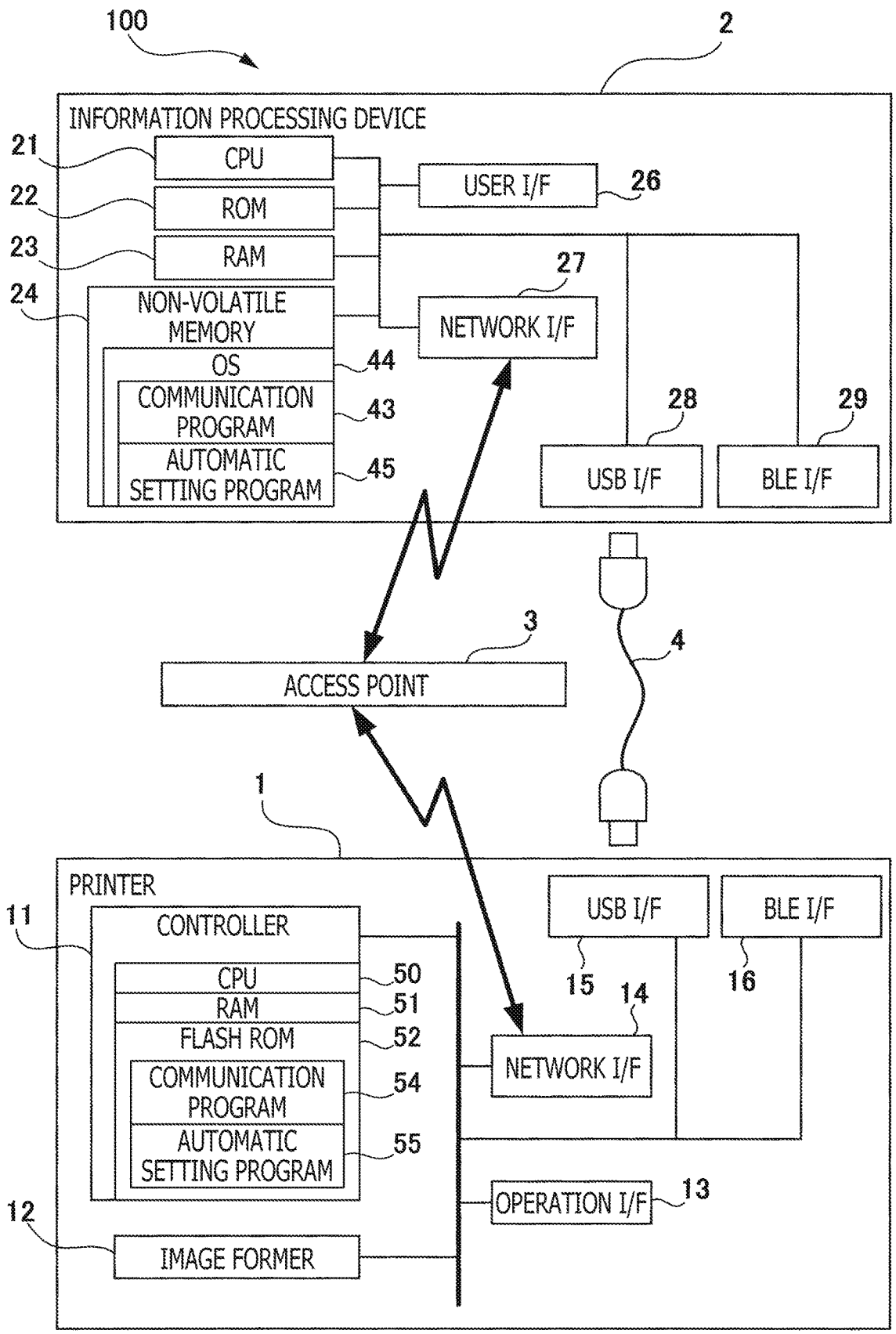
FIG. 1 is a block diagram schematically showing a configuration of a printing system in a first illustrative embodiment according to one or more aspects of the present disclosure.

Specifically, in the first illustrative embodiment according to aspects of the present disclosure, as shown in FIG. 1, a printing system 100 includes a printer 1 and an information processing device 2 that are communicably interconnected. The printer 1 is configured to perform image formation on a medium such as a print sheet. Examples of the printer 1 may include, but are not limited to, a label printer, a page printer, a copy machine, and a multi-function peripheral.

The information processing device 2 is configured to generate and edit image data used for image formation by the printer 1 and to transmit a print execution instruction and the image data to the printer 1. Examples of the information processing device 2 may include, but are not limited to, a smartphone, a personal computer, and a tablet computer. It is noted that the printing system 100 may include one or more image forming apparatuses 1 and one or more information processing devices 2.

In an example shown in FIG. 1, the printing system 100 has a single printer 1 and a single information processing device 2. It is noted that the printer 1 may be an example of an "image processing apparatus" according to aspects of the present disclosure. Further, examples of the "image processing apparatus" according to aspects of the present disclosure may include, but are not limited to, an image scanner.

As shown in FIG. 1, the printer 1 includes a controller 11, an image former 12, an operation I/F ("I/F" is an abbreviation of "interface") 13, a network I/F 14, a USB I/F 15, and a BLE I/F 16. It is noted that "BLE" is an abbreviation of "Bluetooth (trademark registered) Low Energy." The controller 11 includes a CPU 50 and memories such as a RAM 51 and a flash ROM 52. The controller 11 is configured to control each of elements included in the printer 1.

The controller 11 is a general expression collectively representing hardware elements used for control of the printer 1. Specifically, the controller 11 may include an ASIC ("ASIC" is an abbreviation of "Application Specific Integrated Circuit"). Accordingly, the ASIC may serve for a part of the functions of the CPU 50. Further, a logic circuit may serve for a part of the functions of the controller 11.

The flash ROM 52 stores programs to control each of the elements included in the printer 1.

Further, the flash ROM 52 stores a communication program 54 and an automatic setting program 55. The communication program 54 is configured to, when executed by the CPU 50, cause the CPU 50 to perform communication with an external device via the network I/F 14. The automatic setting program 55 is configured to, when executed by the CPU 50, cause the CPU 50 to perform communication with an external device via the USB I/F 15 or the BLE I/F 16.

The image former 12 is configured to perform image formation on a medium (e.g., a print sheet), based on image data transmitted by the information processing device 2. Exemplary image forming methods of the image former 12 may include, but are not limited to, a thermal printing method, an electrophotographic method, and an inkjet printing method. Further, the image former 12 may be capable of color printing or of only monochrome printing.

In the first illustrative embodiment, the image former 12 is configured to perform monochrome printing in thermal printing method.

For instance, the operation I/F 13 may include a touch panel configured to accept an input from a user and display various types of information. Further, the operation I/F 13 may include various display lamps and buttons.

The network I/F 14 includes a communication circuit for performing communication with a party device in a first communication system by using the communication program 54.

The USB I/F 15 includes a communication circuit for performing communication with a party device in a second communication system by using the automatic setting program 55.

The BLE I/F 16 includes a communication circuit for performing communication with a party device in the second communication system by using the automatic setting program 55.

As shown in FIG. 1, the information processing device 2 includes a CPU 21, a ROM 22, a RAM 23, a non-volatile memory 24, a user I/F 26, a network I/F 27, a USB I/F 28, and a BLE I/F 29. The ROM 22 stores a boot program for booting the information processing device 2. The RAM 23 may be used as a work area or a storage area to temporarily storing data, when the CPU 21 is performing various types of processing.

Examples of the non-volatile memory 24 may include, but are not limited to, an HDD and a flash memory. For instance, the non-volatile memory 24 may include at least one of the HDD and the flash memory. The non-volatile memory 24 stores an operating system (hereinafter referred to as an "OS") 44 and various types of programs and data.

The OS 44 has a communication program 43 and an automatic setting program 45. The communication program 43 is configured to, when executed by the CPU 21, cause the CPU 21 to perform communication with a party device (e.g., printer 1) via the network I/F 27. Further, the automatic setting program 45 is configured to, when executed by the CPU 21, cause the CPU 21 to perform communication with a party device via the USB I/F 28 or the BLE I/F 29.

The CPU 21 is configured to perform various types of processing in accordance with programs read out from the ROM 22 or the non-volatile memory 24.

For instance, the user I/F 26 may include a display and a touch panel overlaid on the display. The display is configured to display thereon necessary information. The touch panel is configured to accept an input from the user.

It is noted that devices serving as the user I/F 26 may be provided separately from the information processing device 2. In this case, the information processing device 2 may have interfaces connectable with the devices (e.g., a keyboard, a mouse, and a display) serving as the user I/F 26.

The network I/F 27 includes a communication circuit for performing communication with a party device (e.g., the printer 1) in the first communication system.

In the printing system 100 of the first illustrative embodiment, the information processing device 2 and the printer 1 perform wireless communication, which requires authentication and complies with Wi-Fi (trademark registered) standards, with each other via an access point 3. Namely, the network I/Fs 14 and 27 are interfaces capable of wireless communication complying with the Wi-Fi standards. More specifically, the network I/Fs 14 and 27 are interfaces capable of wireless communication based on IEEE 802.11 standards and equivalent standards.

In the first illustrative embodiment, the information processing device 2 is already connected with the access point 3. Therefore, the non-volatile memory 24 stores a Wi-Fi SSID (i.e., a name of the access point 3) and passphrase (i.e., an encryption key of the access point 3). Namely, the Wi-Fi SSID and the passphrase may have been stored in the non-volatile memory 24 when the information processing device 2 established a Wi-Fi connection with the access point 3 earlier.

The USB I/F 28 includes a communication circuit for performing communication with a party device (e.g., the printer 1) via a USB cable 4 in the second communication system. Accordingly, the information processing device 2 may perform wired communication with the printer 1 when the USB I/F 28 is connected with the USB I/F 15 of the printer 1 via the USB cable 4.

The BLE I/F 29 includes a communication circuit for performing communication with a party device (e.g., the printer 1) in the second communication system.

Communication modes applicable in the first illustrative embodiment are not limited to the above-exemplified communication modes. For instance, the communication between the information processing device 2 and the printer 1 may be direct wireless communication without involving the access point 3, or may be communication via a wired connection other than the USB connection.

In the printing system 100 of the first illustrative embodiment, in order to perform wireless communication according to the Wi-Fi standards between the printer 1 and the access point 3, there is a need to configure, in the printer 1, initial settings for the Wi-Fi connection between the printer 1 and the access point 3. Hence, referring to FIGS. 2A and 2B, an automatic Wi-Fi setting process will be described, which is performed by the information processing device 2, to automatically configure, in the printer 1, the initial settings for the Wi-Fi connection between the printer 1 and the access point 3. For instance, the automatic Wi-Fi setting process shown in FIGS. 2A and 2B may be performed by the CPU 21 executing one or more programs (e.g., the automatic setting program 45) stored in the non-volatile memory 24.

For instance, in response to a user operation of connecting the USB I/F 15 of the printer 1 with the USB I/F 28 of the information processing device 2 via the USB cable 4 while the information processing device 2 is in operation, the automatic Wi-Fi setting process begins to be performed by the CPU 21. Further, in data transfer between the information processing device 2 and the printer 1 in the automatic Wi-Fi setting process, the OS 44 of the information processing device 2 and the controller 11 of the printer 1 are involved, and descriptors and control transfer on the USB standards are used.

First, the CPU 21 determines whether the USB cable 4 connected with the printer 1 is connected to the USB I/F 28 (S10).

For instance, when the user has connected an end of the USB cable 4, of which the other end is connected with the USB I/F 15 of the printer 1, to the USB I/F 28 of the information processing device 2, the CPU 21 determines that the USB cable 4 connected with the printer 1 is connected to the USB I/F 28 of the information processing device 2 (S10: Yes). Further, when the user has connected the end of the USB cable 4, of which the other end is connected with the USB I/F 28 of the information processing device 2, to the USB I/F 15 of the printer 1, the CPU 21 also makes the affirmative determination (S10: Yes).

Further, for example, only when the user has first connected the printer 1 and the information processing device 2 with each other via the USB cable 4, the CPU 21 may make the affirmative determination (S10: Yes). In another exemplary case, each time the user connects the printer 1 and the information processing device 2 with each other via the USB cable 4, the CPU 21 may make the affirmative determination (S10: Yes).

When determining that the USB cable 4 connected with the printer 1 is connected to the USB I/F 28 of the information processing device 2 (S10: Yes), the CPU 21 transmits to the printer 1 an inquiry about whether the printer 1 complies with automatic Wi-Fi setting (S11), and goes to S12. Specifically, in S11, the CPU 21 transmits, to the printer

1 via the USB I/F 28, an inquiry about whether the printer 1 complies with a particular setting protocol including a procedure to receive Wi-Fi setting information from the OS 44 of the information processing device 2, i.e., whether the printer 1 complies with the automatic Wi-Fi setting.

Meanwhile, when determining that the USB cable 4 connected with the printer 1 is not connected to the USB I/F 28 of the information processing device 2 (S10: No), the CPU 21 goes back to S10. It is noted that the automatic Wi-Fi setting process is performed as one of time-division multiplexing processes on the information processing device 2. Accordingly, in S10, when the CPU 21 determines that the USB cable 4 is not connected with the USB I/F 28 (S10: No), another process may be carried out on the information processing device 2.

Subsequently, the CPU 21 receives data from the printer 1 via the USB I/F 28 (S12).

Next, the CPU 21 determines whether the data received in S12 includes information regarding whether the printer 1 complies with the automatic Wi-Fi setting (S13). When determining that the CPU 21 has received in S12 information regarding whether the printer 1 complies with the particular setting protocol, i.e., when determining that the data received in S12 includes information regarding whether the printer 1 complies with the automatic Wi-Fi setting (S13: Yes), the CPU 21 goes to S14.

Meanwhile, when determining that the data received in S12 does not include information regarding whether the printer 1 complies with the automatic Wi-Fi setting (S13: No), the CPU 21 determines that the printer 1 does not comply with the automatic Wi-Fi setting, and terminates the automatic Wi-Fi setting process shown in FIGS. 2A and 2B.

Subsequently, the CPU 21 determines whether the printer 1 complies with the automatic Wi-Fi setting, based on the data received in S12 (S14).

When determining that the printer 1 complies with the automatic Wi-Fi setting (S14: Yes), the CPU 21 transmits, to the printer 1 via the USB I/F 28, an inquiry about whether the settings for the Wi-Fi connection with the access point 3 have been configured in the printer 1 (S15). It is noted that hereinafter, the "settings for the Wi-Fi connection between the printer 1 and the access point 3" may be simply referred to as the "Wi-Fi connection settings."

In the first illustrative embodiment, the CPU 21 makes the determination in S14, based on the data (e.g., compliance information or incompliance information) regarding whether the printer 1 complies with the particular setting protocol. Nonetheless, in another exemplary case, the CPU 21 may make the determination in S14, based on specific information (e.g., a model number of the printer 1) for the printer 1. Specifically, the CPU 21 may make the determination in S14, by inquiring, of an external server, association information representing an association between the above specific information and whether the printer 1 complies with the particular setting protocol including the procedure to receive the Wi-Fi setting information from the OS 44.

Meanwhile, when determining that the printer 1 does not comply with the automatic Wi-Fi setting (S14: No), the CPU 21 terminates the automatic Wi-Fi setting process shown in FIGS. 2A and 2B.

Next, as a response to the inquiry transmitted to the printer 1 in S15, the CPU 21 receives, from the printer 1 via the USB I/F 28, information regarding whether the Wi-Fi connection settings have been configured in the printer 1 (S16).

Then, the CPU 21 determines whether the data received in S16 includes information regarding whether the Wi-Fi connection settings have been configured in the printer 1 (S17). When determining that the data received in S16 includes information regarding whether the Wi-Fi connection settings have been configured in the printer 1 (S17: Yes), the CPU 21 goes to S18.

Meanwhile, when determining that the data received in S16 does not include information regarding whether the Wi-Fi connection settings have been configured in the printer 1 (S17: No), the CPU 21 goes back to S16.

Next, the CPU 21 determines whether the Wi-Fi connection settings have been configured in the printer 1, based on the data received in S16 (S18).

When determining that the Wi-Fi connection settings have been configured in the printer 1 (S18: Yes), the CPU 21 terminates the automatic Wi-Fi setting process shown in FIGS. 2A and 2B.

Meanwhile, when determining that the Wi-Fi connection settings have been configured in the printer 1 (S18: No), the CPU 21 inquires of the user whether to automatically configure the settings for the Wi-Fi connection between the printer 1 and the access point 3 (S19).

For instance, the CPU 21 may make the inquiry in S19, by displaying on the user I/F 26 a message "Would you like to proceed with automatic configuration of the Wi-Fi connection settings?" together with a "Continue" button and a "Cancel" button.

Subsequently, the CPU 21 determines whether the user has accepted the automatic configuration of the settings for the Wi-Fi connection between the printer 1 and the access point 3, for instance, based on which button the user has touched of the "Continue" button and the "Cancel" button (S20).

When the user has touched the "Continue" button on the user I/F 26, the CPU 21 determines that the user has accepted the automatic configuration of the settings for the Wi-Fi connection between the printer 1 and the access point 3 (S20: Yes). In this case, the CPU 21 acquires Wi-Fi connection information stored in the non-volatile memory 24 (S21). Specifically, in the first illustrative embodiment, the CPU 21 may acquire, as the Wi-Fi connection information, the Wi-Fi SSID (i.e., the name of the access point 3) and the passphrase (i.e., the encryption key of the access point 3).

Subsequently, the CPU 21 transmits, to the printer 1, the Wi-Fi connection information acquired in S21 (S22). Afterward, the CPU 21 terminates the automatic Wi-Fi setting process shown in FIGS. 2A and 2B.

Meanwhile, when the user has touched the "Cancel" button on the user I/F 26, the CPU 21 determines that the user has not accepted the automatic configuration of the settings for the Wi-Fi connection between the printer 1 and the access point 3 (S20: No), and terminates the automatic Wi-Fi setting process shown in FIGS. 2A and 2B.

Figure 3A:
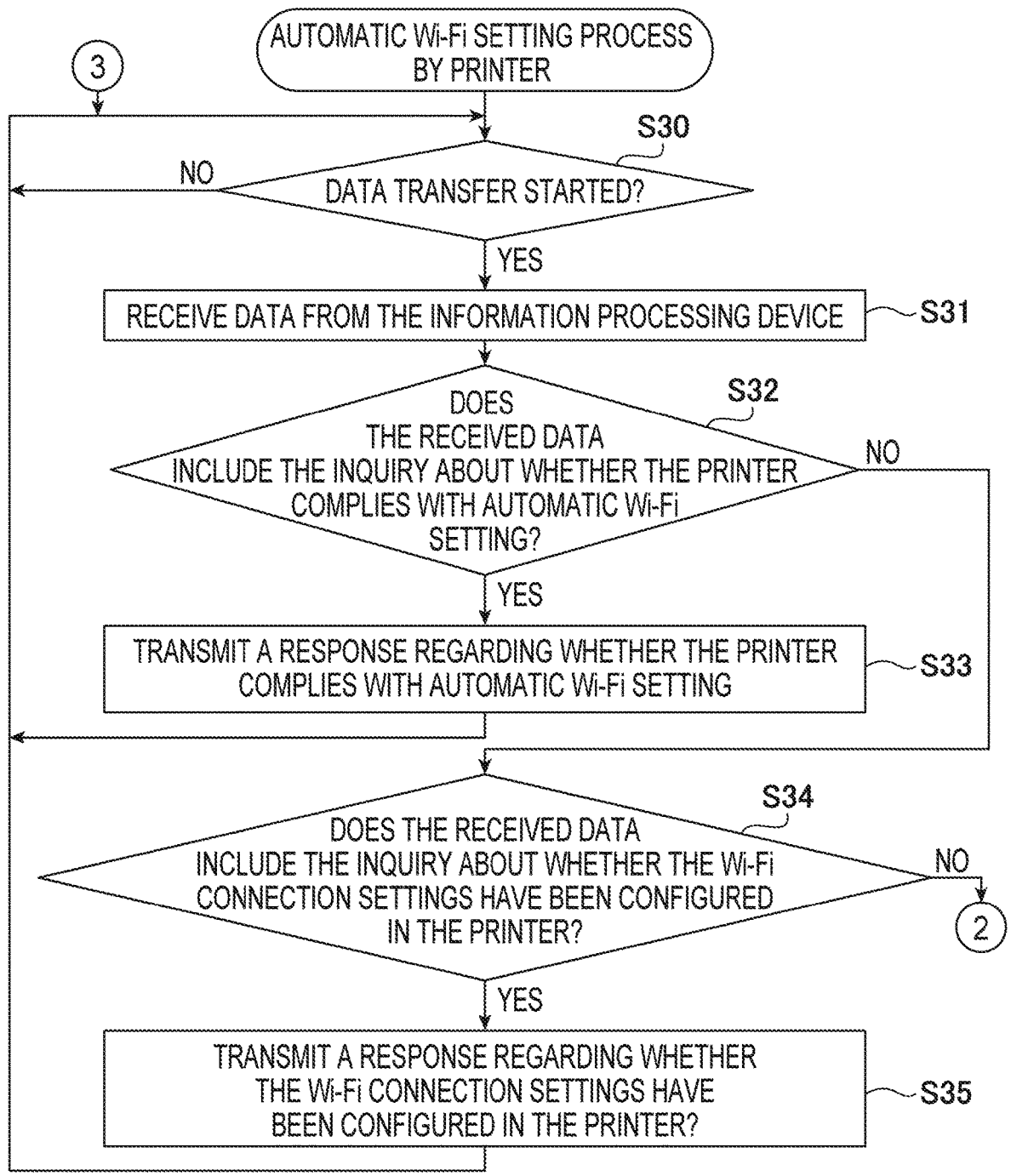
FIGS. 3A and 3B are flowcharts showing a procedure of an automatic Wi-Fi setting process to be performed by a printer included in the printing system in the first illustrative embodiment according to one or more aspects of the present disclosure.
Figure 3B:
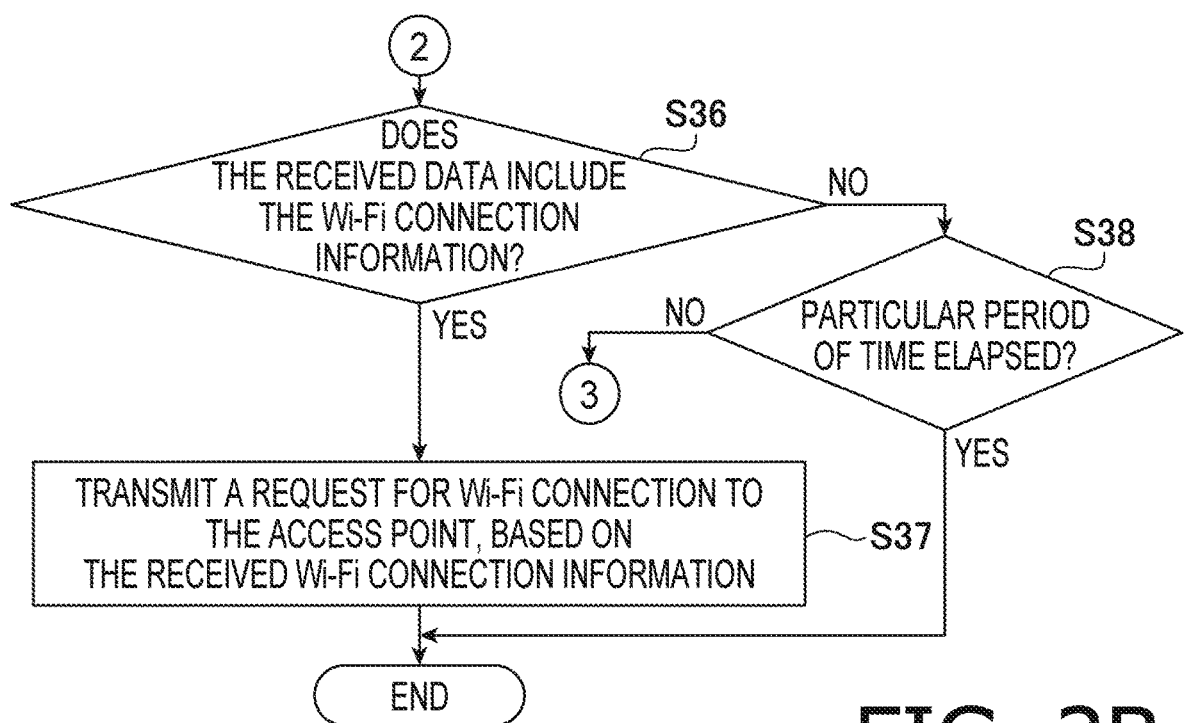

Subsequently, referring to FIGS. 3A and 3B, an explanation will be provided of an automatic Wi-Fi setting process to be performed by the printer 1. It is noted that the automatic Wi-Fi setting process shown in FIGS. 3A and 3B is performed by the controller 11 of the printer 1. For instance, the automatic Wi-Fi setting process shown in FIGS. 3A and 3B may be performed by the CPU 50 executing one or more programs (e.g., the automatic setting program 55) stored in the flash ROM 52.

First, the controller 11 determines whether data transfer from the information processing device 2 via the USB I/F 15 has been started (S30). When there is no data transferred from the information processing device 2, the controller 11 determines that data transfer from the information processing device 2 via the USB I/F 15 has not been started (S30: No), and goes back to S30.

Meanwhile, when there is data transferred from the information processing device 2, the controller 11 determines that data transfer from the information processing device 2 via the USB I/F 15 has been started (S30: Yes). In this case, the controller 11 receives the data transferred from the information processing device 2 via the USB I/F 15 (S31).

Next, the controller 11 determines whether the data received in S31 includes the inquiry about whether the printer 1 complies with the automatic Wi-Fi setting (S32).

When determining that the data received in S31 includes the inquiry about whether the printer 1 complies with the automatic Wi-Fi setting (S32: Yes), the controller 11 transmits a response to the inquiry to the information processing device 2 via the USB I/F 15 (S33). Thereafter, the controller 11 goes back to S30. In this case, it is noted that the data received in S31 may further include information representing that the OS 44 of the information processing device 2 complies with the particular setting protocol.

In the first illustrative embodiment, in S33, when the printer 1 complies with the particular setting protocol including the procedure to receive the Wi-Fi setting information from the OS 44 of the information processing device 2, in response to the inquiry received in S31, the controller 11 transmits compliance information to the information processing device 2. It is noted that the compliance information represents that the printer 1 complies with the particular setting protocol including the procedure to receive the Wi-Fi setting information from the OS 44 of the information processing device 2. Thus, by transmitting the compliance information to the information processing device 2, the printer 1 may share, with the information processing device 2, mutual recognition that both the printer 1 and the information processing device 2 comply with the particular setting protocol. Meanwhile, when the printer 1 does not comply with the particular setting protocol including the procedure to receive the Wi-Fi setting information from the OS 44 of the information processing device 2, in response to the inquiry received in S31, the controller 11 transmits incompliance information to the information processing device 2. It is noted that the incompliance information represents that the printer 1 does not comply with the particular setting protocol including the procedure to receive the Wi-Fi setting information from the OS 44 of the information processing device 2. Or, when the controller 11 is unable to construe the inquiry included in the data received in S31, the controller 11 may transmit an error response to the information processing device 2.

Further, instead of the compliance information or the incompliance information, the controller 11 may transmit, to the information processing device 2, specific information (e.g., the model number of the printer 1) for the printer 1.

Meanwhile, when determining that the data received in S31 does not include the inquiry about whether the printer 1 complies with the automatic Wi-Fi setting (S32: No), the controller 11 determines whether the data received in S31 includes the inquiry about whether the Wi-Fi connection settings have been configured in the printer 1 (S34).

When determining that the data received in S31 includes the inquiry about whether the Wi-Fi connection settings have been configured in the printer 1 (S34: Yes), the controller 11 transmits information regarding whether the Wi-Fi connection settings have been configured in the printer 1, to the information processing device 2 via the USB I/F 15 (S35). Afterward, the controller 11 goes back to S30.

In the first illustrative embodiment, for instance, when the Wi-Fi connection information (e.g., the Wi-Fi SSID and the passphrase) is stored in a particular area of the flash ROM 52, the controller 11 determines that the Wi-Fi connection settings have been configured in the printer 1, and transmits to the information processing device 2 current setting information representing that the Wi-Fi connection settings have been configured in the printer 1. Further, for instance, when the Wi-Fi connection information (e.g., the Wi-Fi SSID and the passphrase) is not stored in the particular area of the flash ROM 52, the controller 11 determines that the printer 1 has not configured the Wi-Fi connection settings, and transmits to the information processing device 2 current setting information representing that the printer 1 has not configured the Wi-Fi connection settings.

Meanwhile, when determining that the data received in S31 does not include the inquiry about whether the Wi-Fi connection settings have been configured in the printer 1 (S34: No), the controller 11 determines whether the data received in S31 includes the Wi-Fi connection information (S36).

When determining that the data received in S31 includes the Wi-Fi connection information (S36: Yes), the controller 11 stores the received Wi-Fi connection information into the flash ROM 52, and transmits a request for Wi-Fi connection to the access point 3 based on the received Wi-Fi connection information (S37). Thereafter, the controller 11 terminates the automatic Wi-Fi setting process shown in FIGS. 3A and 3B.

Specifically, in the first illustrative embodiment, the controller 11 selects the access point 3 based on the SSID included in the received Wi-Fi connection information, and issues the request for Wi-Fi connection by transmitting to the access point 3 the passphrase included in the received Wi-Fi connection information.

Meanwhile, when determining that the data received in S31 does not include the Wi-Fi connection information (S36: No), the controller 11 determines whether a particular period of time has elapsed since execution of S33 (S38).

When determining that the particular period of time has not elapsed since execution of S33 (S38: No), the controller 11 goes back to S30.

Meanwhile, when determining that the particular period of time has elapsed since execution of S33 (S38: Yes), the controller 11 terminates the automatic Wi-Fi setting process shown in FIGS. 3A and 3B.

As described above, in the automatic Wi-Fi setting process (see FIGS. 2A and 2B) by the CPU 21 of the information processing device 2, when the user touches the "Cancel" button displayed on the user I/F 26 (S20: No) in response to the CPU 21 inquiring of the user whether to automatically configure the settings for the Wi-Fi connection between the printer 1 and the access point 3 (S19), the CPU 21 terminates the automatic Wi-Fi setting process shown in FIGS. 2A and 2B. Accordingly, the Wi-Fi connection information is not transferred from the information processing device 2 to the printer 1.

Therefore, when the particular period of time has elapsed since execution of S33, the controller 11 of the printer 1 terminates the automatic Wi-Fi setting process shown in FIGS. 3A and 3B. Preferably, the particular period of time may be, but is not limited to, a time as long as 5-10 minutes. Further, the particular period of time may be a reference elapsed time from execution of S35.

Figure 4:
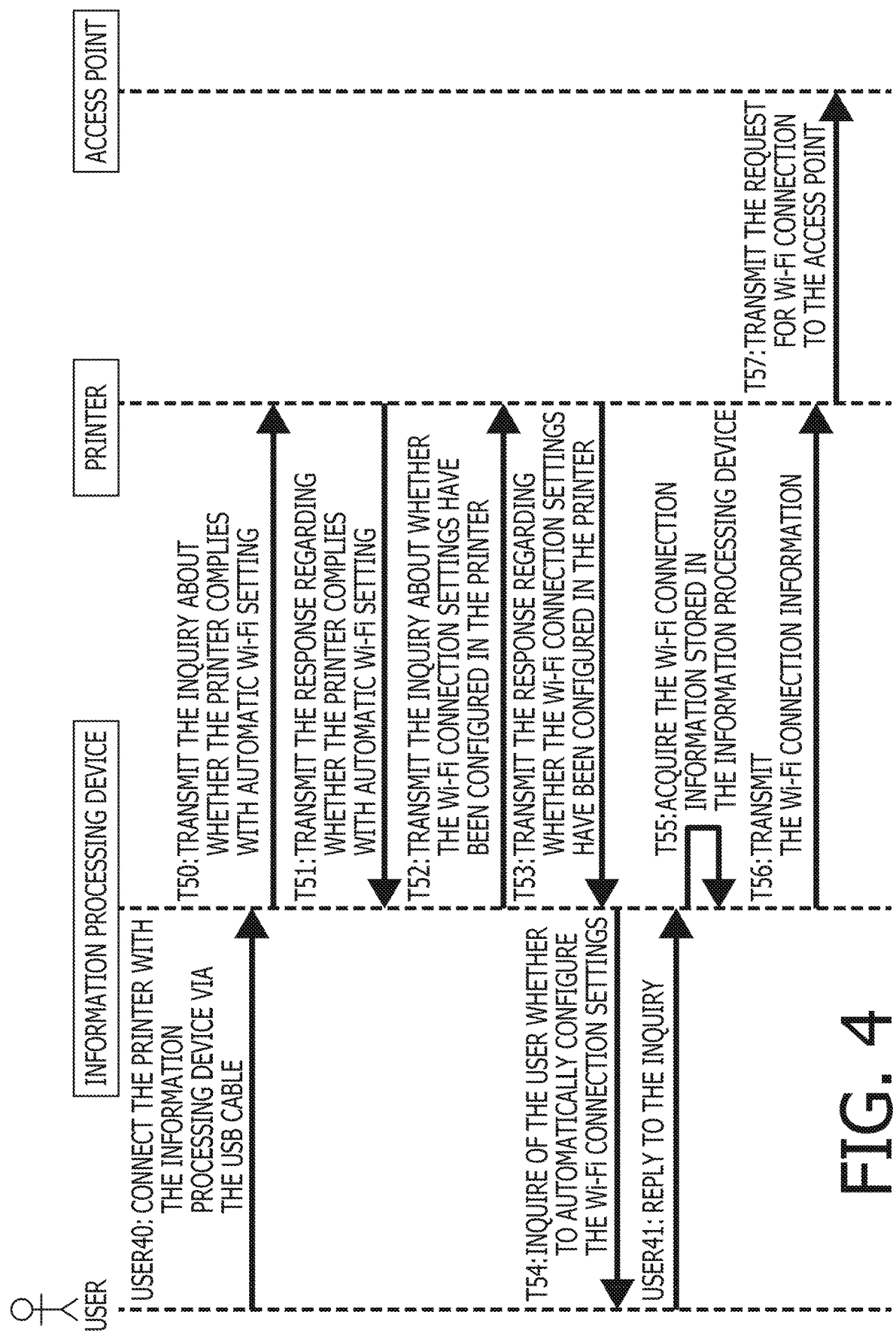
FIG. 4 is a sequence chart showing a specific procedure of an automatic Wi-Fi setting process in the printing system that is attained by the processes shown in FIGS. 2 and 3, in the first illustrative embodiment according to one or more aspects of the present disclosure.

Subsequently, referring to FIG. 4, an explanation will be provided of a specific procedure of an automatic Wi-Fi setting process in the printing system 100. The automatic Wi-Fi setting process shown in FIG. 4 is attained by the aforementioned processes shown in FIGS. 2 and 3. In the following description, each of processes/operations by the user will be identified by a reference character of "USER" plus a specific number therefor (e.g., "USER40" and the like). Further, each of processes/operations by the CPU 21 of the information processing device 2 and the controller 11 of the printer 1 will be identified by a reference character of "T" plus a specific number therefor (e.g., "T50," "T51," and the like).

First, in USER40, the user connects the printer 1 and the information processing device 2 with each other via the USB cable 4.

Figure 2A:
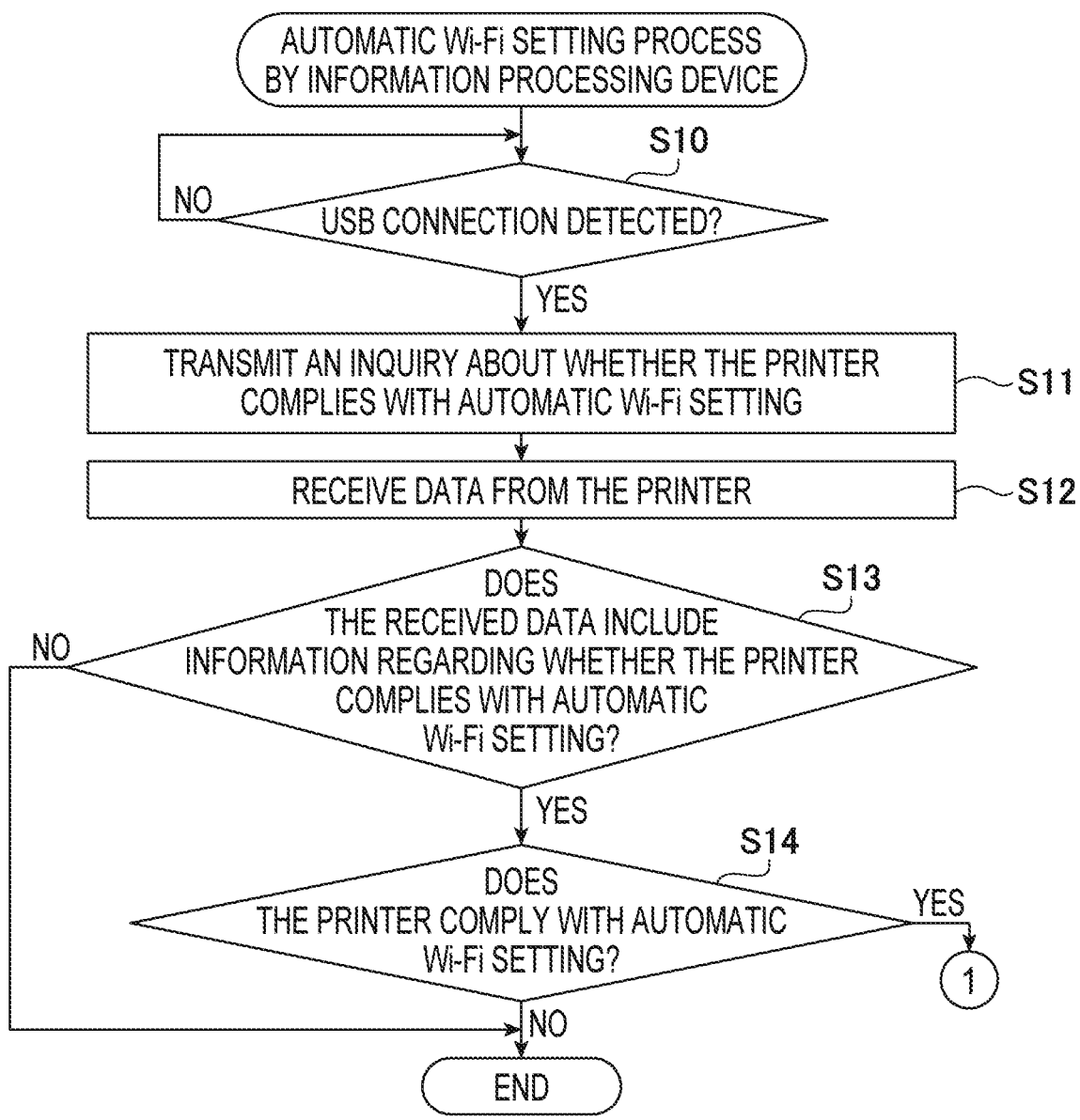
FIGS. 2A and 2B are flowcharts showing a procedure of an automatic Wi-Fi setting process to be performed by an information processing device included in the printing system in the first illustrative embodiment according to one or more aspects of the present disclosure.

Then, in T50, in response to detecting the USB connection established in USER40 (FIG. 2A, S10: Yes), the CPU 21 of the information processing device 2 transmits, to the printer 1, the inquiry about whether the printer 1 complies with the automatic Wi-Fi setting (FIG. 2A, S11).

Next, in T51, the controller 11 of the printer 1 transmits, to the information processing device 2, the response to the inquiry about whether the printer 1 complies with the automatic Wi-Fi setting (FIG. 3A, S33).

Next, in T52, when determining that the printer 1 complies with the automatic Wi-Fi setting (FIG. 2A, S14: Yes), the CPU 21 of the information processing device 2 transmits, to the printer 1, the inquiry about whether the Wi-Fi connection settings have been configured in the printer 1 (FIG. 2B, S15).

Subsequently, in T53, in response to the inquiry received from the information processing device 2 in T52, the controller 11 of the printer 1 transmits the information regarding whether the Wi-Fi connection settings have been configured in the printer 1, to the information processing device 2 (FIG. 3A, S35).

Figure 2B:
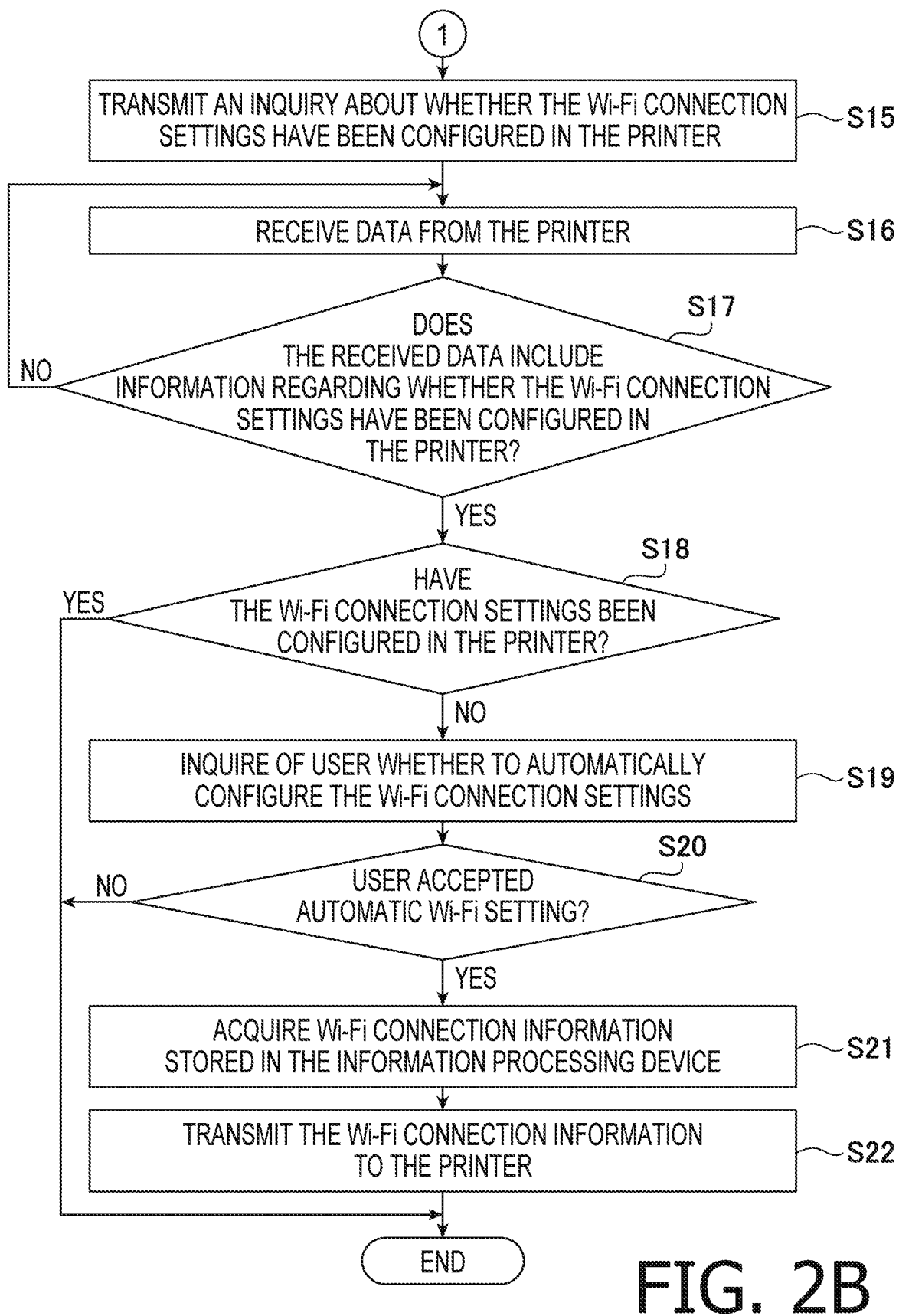

Then, in TM, when determining that the Wi-Fi connection settings have been configured in the printer 1 (FIG. 2B, S18: No), the CPU 21 of the information processing device 2 inquires of the user whether to automatically configure the settings for the Wi-Fi connection between the printer 1 and the access point 3 (FIG. 2B, S19).

Subsequently, in USER41, the user replies to the inquiry made in TM by touching the "Continue" button or the "Cancel" button displayed on the user I/F 26.

Then, in T55, when determining that the user has accepted the automatic configuration of the settings for the Wi-Fi connection between the printer 1 and the access point 3 (FIG. 2B, S20: Yes), the CPU 21 of the information processing device 2 acquires the Wi-Fi connection information stored in the non-volatile memory 24 (FIG. 2B, S21).

Next, in T56, the CPU 21 of the information processing device 2 transmits the acquired Wi-Fi connection information to the printer 1 (FIG. 2B, S22).

Then, in T57, the controller 11 of the printer 1 transmits the request for Wi-Fi connection to the access point 3 based on the received Wi-Fi connection information (FIG. 3B, S37).

Thus, in the first illustrative embodiment, when the printer 1 and the OS 44 of the information processing device 2 comply with the particular setting protocol, in response to a USB connection being established between the printer 1 and the information processing device 2, the Wi-Fi connection information for performing communication therebetween via the commonly-used access point 3 is transferred from the information processing device 2 to the printer 1. Hence, with no need to install an application program specific for communication setting into the information processing device 2, by using the function of the OS 44, it is possible to cause the printer 1 to automatically configure the Wi-Fi connection settings. Thus, according to the first illustrative embodiment, a user-friendly technology is provided to reduce troublesome operations for communication setting.

For instance, in a case where the OS 44 of the information processing device 2 needs a driver for controlling the printer 1, an application program specific for communication setting may be installed into the information processing device 2 on the occasion when the driver is installed thereinto. However, in a case where the OS 44 is a driver-less OS which does not need a driver for controlling the printer 1, there is no chance to install the application program specific for communication setting into the information processing device 2 when installing the driver thereinto. Even in such a case that the OS 44 is a driver-less OS, when the OS 44 complies with the particular setting protocol, it is possible to easily cause the printer 1 to automatically configure the Wi-Fi connection settings.

Second Illustrative Embodiment

A second illustrative embodiment according to aspects of the present disclosure will be described below with reference to the accompanying drawings. In the second illustrative embodiment, aspects of the present disclosure are applied to a printing system including an image forming apparatus and an information processing device that are communicably interconnected. In the following description, substantially the same elements as exemplified in the aforementioned first illustrative embodiment may be provided with the same reference characters.

In the aforementioned first illustrative embodiment, the automatic Wi-Fi setting for the printer 1 is started in response to the user connecting the printer 1 to the information processing device 2 via the USB cable 4. The second illustrative embodiment is different from the first illustrative embodiment in that the automatic Wi-Fi setting for the printer 1 is started in response to the user performing an operation to start configuring the Wi-Fi connection settings via the operation I/F 13. Hereinafter, referring to FIGS. 5A and 5B, an explanation will be provided of an automatic Wi-Fi setting process to be performed by the controller 11 of the printer 1. For instance, the automatic Wi-Fi setting process shown in FIGS. 5A and 5B may be performed by the CPU 50 executing one or more programs (e.g., the automatic setting program 55) stored in the flash ROM 52.

First, the controller 11 determines whether a user operation has been performed via the operation I/F 13 (S60). When determining that a user operation has been performed via the operation I/F 13 (S60: Yes), the controller 11 accepts the user operation (S61).

Meanwhile, when determining that a user operation has not been performed via the operation I/F 13 (S60: No), the controller 11 goes back to S60 and waits until a user operation is performed via the operation I/F 13.

Subsequently, the controller 11 determines whether the user operation via the operation I/F 13 is an operation to start configuring the Wi-Fi connection settings (S62). When determining that the user operation via the operation I/F 13 is not an operation to start configuring the Wi-Fi connection settings (S62: No), the controller 11 goes back to S60.

Meanwhile, when determining that the user operation via the operation I/F 13 is an operation to start configuring the Wi-Fi connection settings (S62: Yes), the controller 11 transmits a request for Wi-Fi connection information for configuring the Wi-Fi connection settings to the information processing device 2 via the BLE I/F 16 (S63). Specifically, there may be a plurality of information processing devices 2 connectable with the printer 1. Hence, the controller 11 performs advertising to one or more information processing devices 2. Then, when communicably connected with an intended information processing device 2 through the advertising, the printer 1 transmits the request for Wi-Fi connection information for configuring the Wi-Fi connection settings to the information processing device 2. Thereafter, the controller 11 goes to S64. It is noted that the request transmitted in S63 may include information representing that the printer 1 has an automatic Wi-Fi setting function. In other words, the request transmitted in S63 may include the compliance information representing that the printer 1 complies with the automatic Wi-Fi setting.

Subsequently, the controller 11 determines whether the controller 11 has received data from the information processing device 2 via the BLE I/F 16 (S64). When determining that the controller 11 has received data from the information processing device 2 via the BLE I/F 16 (S64: Yes), the controller 11 goes to S66.

Next, the controller 11 determines whether the data received in S64 includes a response, to the request transmitted in S63, representing that the information processing device 2 has accepted the request (S66). When determining that the data received in S64 does not include a response representing that the information processing device 2 has accepted the request (S66: No), the controller 11 goes back to S64.

Meanwhile, when determining that the data received in S64 includes a response representing that the information processing device 2 has accepted the request (S66: Yes), the controller 11 determines whether the controller 11 has received further data transferred from the information processing device 2 via the BLE I/F 16 (S67).

Meanwhile, when determining that the controller 11 has not received data from the information processing device 2 via the BLE I/F 16 (S64: No), the controller 11 determines whether a predetermined period of time has elapsed (S68). When determining that the predetermined period of time has not elapsed (S68: No), the controller 11 goes back to S64.

Meanwhile, when determining that the predetermined period of time has elapsed (S68: Yes), the controller 11 terminates the automatic Wi-Fi setting process shown in FIGS. 5A and 5B. It is noted that the predetermined period of time is an elapsed time from execution of S63. When the controller 11 does not receive, from the information processing device 2, the response representing that the information processing device 2 has accepted the request even after a lapse of the predetermined period of time since the controller 11 transmitted the request for Wi-Fi connection information in S63, it is considered that the information processing device 2 does not have the automatic Wi-Fi setting function. Therefore, in this case, the automatic Wi-Fi setting process (see FIGS. 5A and 5B) by the printer 1 is terminated. Further, the predetermined period of time may be, but is not limited to, several seconds.

Further, when determining that the predetermined period of time has elapsed (S68: Yes), the controller 11 may display, on the operation I/F 13, information representing that the information processing device 2 does not have the automatic Wi-Fi setting function, and thereafter may terminate the automatic Wi-Fi setting process shown in FIGS. 5A and 5B.

Subsequently, when determining that the controller 11 has received further data transferred from the information processing device 2 via the BLE I/F 16 (S67: Yes), the controller 11 determines whether the data received in S67 includes the Wi-Fi connection information (S70). When determining that the data received in S67 includes the Wi-Fi connection information (S70: Yes), the controller 11 transmits a request for Wi-Fi connection to the access point 3 based on the received the Wi-Fi connection information (S71). Afterward, the controller 11 terminates the automatic Wi-Fi setting process shown in FIGS. 5A and 5B.

Specifically, in the second illustrative embodiment, the controller 11 selects the access point 3 based on the SSID included in the received the Wi-Fi connection information, and issues the request for Wi-Fi connection by transmitting to the access point 3 the passphrase included in the received Wi-Fi connection information.

Meanwhile, when determining that the controller 11 has not received data transferred from the information processing device 2 via the BLE I/F 16 (S67: No), or when determining that the data received in S67 does not include the Wi-Fi connection information (S70: No), the controller 11 determines whether a prescribed period of time has elapsed (S72). Then, when determining that the prescribed period of time has not elapsed (S72: No), the controller 11 goes back to S67.

Meanwhile, when determining that the prescribed period of time has elapsed (S72: Yes), the controller 11 terminates the automatic Wi-Fi setting process shown in FIGS. 5A and 5B. It is noted that the prescribed period of time is an elapsed time since the controller 11 determined that the data received in S64 includes a response representing that the information processing device 2 has accepted the request issued in S63 (S66: Yes). When the controller 11 does not receive the Wi-Fi connection information from the information processing device 2 even after a lapse of the prescribed period of time since the controller 11 determined that the data received in S64 includes a response representing that the information processing device 2 has accepted the request issued in S63, as will be described later, it is likely that the user may have cancelled the automatic Wi-Fi setting in the information processing device 2. Therefore, in this case, the controller 11 terminates the automatic Wi-Fi setting process shown in FIGS. 5A and 5B.

Subsequently, referring to FIG. 6, an explanation will be provided of an automatic Wi-Fi setting process to be performed by the CPU 21 of the information processing device 2.

First, the CPU 21 detects the advertising from the printer 1 via the BLE I/F 29, and determines whether the CPU 21 has started communication with the printer 1 (S80). When determining that the CPU 21 has started communication with the printer 1 (S80: Yes), the CPU 21 receives data from the printer 1 via the BLE I/F 29 (S81). Afterward, the CPU 21 goes to S82.

Meanwhile, when determining that the CPU 21 has not started communication with the printer 1 (S80: No), the CPU 21 goes back to S80 and waits until the printer 1 starts data transmission to the information processing device 2 via the BLE I/F 29.

Subsequently, the CPU 21 determines whether the data received in S81 includes a request for Wi-Fi connection information (S82). When determining that the data received in S81 includes a request for Wi-Fi connection information (S82: Yes), the CPU 21 transmits a response, to the received request, representing that the request has been accepted, to the printer 1 via the BLE I/F 29 (S83). Thereafter, the CPU 21 goes to S84.

It is noted that the steps S84 to S87 are substantially the same as S19 to S22 shown in FIG. 2B in the aforementioned first illustrative embodiment. Hence, a detailed explanation of S84 to S87 will be omitted. In S85, which is related to the determination in S72 in FIG. 5B, when the user has touched the "Cancel" button on the user I/F 26, the CPU 21 determines that the user has not accepted the automatic configuration of the settings for the Wi-Fi connection between the printer 1 and the access point 3 (S85: No), and terminates the automatic Wi-Fi setting process shown in FIG. 6. Thus, in this case, the CPU 21 does not execute S87, and therefore, the Wi-Fi connection information is not transmitted to the printer 1. Accordingly, in S72 in FIG. 5B, the controller 11 determines that the prescribed period of time has elapsed (S72: Yes), and terminates the automatic Wi-Fi setting process shown in FIGS. 5A and 5B.

Meanwhile, when determining that the data received in S81 does not include a request for Wi-Fi connection information (S82: No), the CPU 21 goes back to S80.

Subsequently, referring to FIG. 7, an explanation will be provided of a specific procedure of an automatic Wi-Fi setting process in the printing system 100. The automatic Wi-Fi setting process shown in FIG. 7 is attained by execution of both the aforementioned processes shown in FIGS. 5 and 6. In the following description, each of processes/operations by the user will be identified by a reference character of "USER" plus a specific number therefor (e.g., "USER42" and the like). Further, each of processes/operations by the CPU 21 of the information processing device 2 and the controller 11 of the printer 1 will be identified by a reference character of "T" plus a specific number therefor (e.g., "T90," "T91," and the like).

First, in USER42, the user performs an operation to start configuring the Wi-Fi connection settings, via the operation I/F 13. Specifically, for instance, the user may operate a button to start configuring the Wi-Fi connection settings via the operation I/F 13.

Figure 5A:
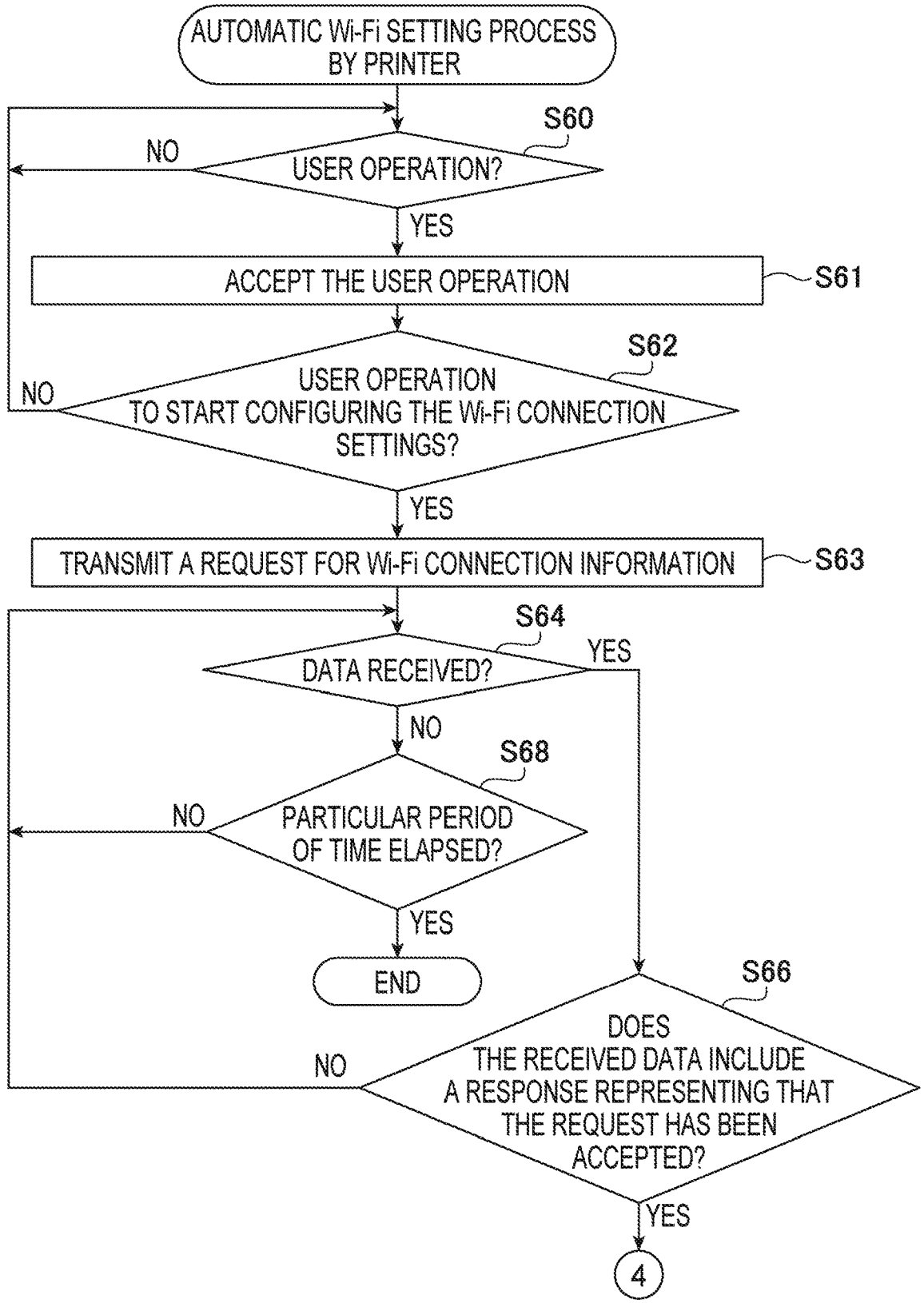
FIGS. 5A and 5B are flowcharts showing a procedure of an automatic Wi-Fi setting process to be performed by the printer in a second illustrative embodiment according to one or more aspects of the present disclosure.

Then, in T90, when detecting the user operation to start configuring the Wi-Fi connection settings (FIG. 5A, S62: Yes), the controller 11 of the printer 1 transmits a request for Wi-Fi connection information for configuring the Wi-Fi connection settings to the information processing device 2 (FIG. 5A, S63).

Subsequently, in T91, when determining that the CPU 21 of the information processing device 2 has received a request for Wi-Fi connection information (FIG. 6, S82: Yes), the CPU 21 transmits a response, to the received request, representing that the request has been accepted, to the printer 1 (FIG. 6, S83).

Figure 6:
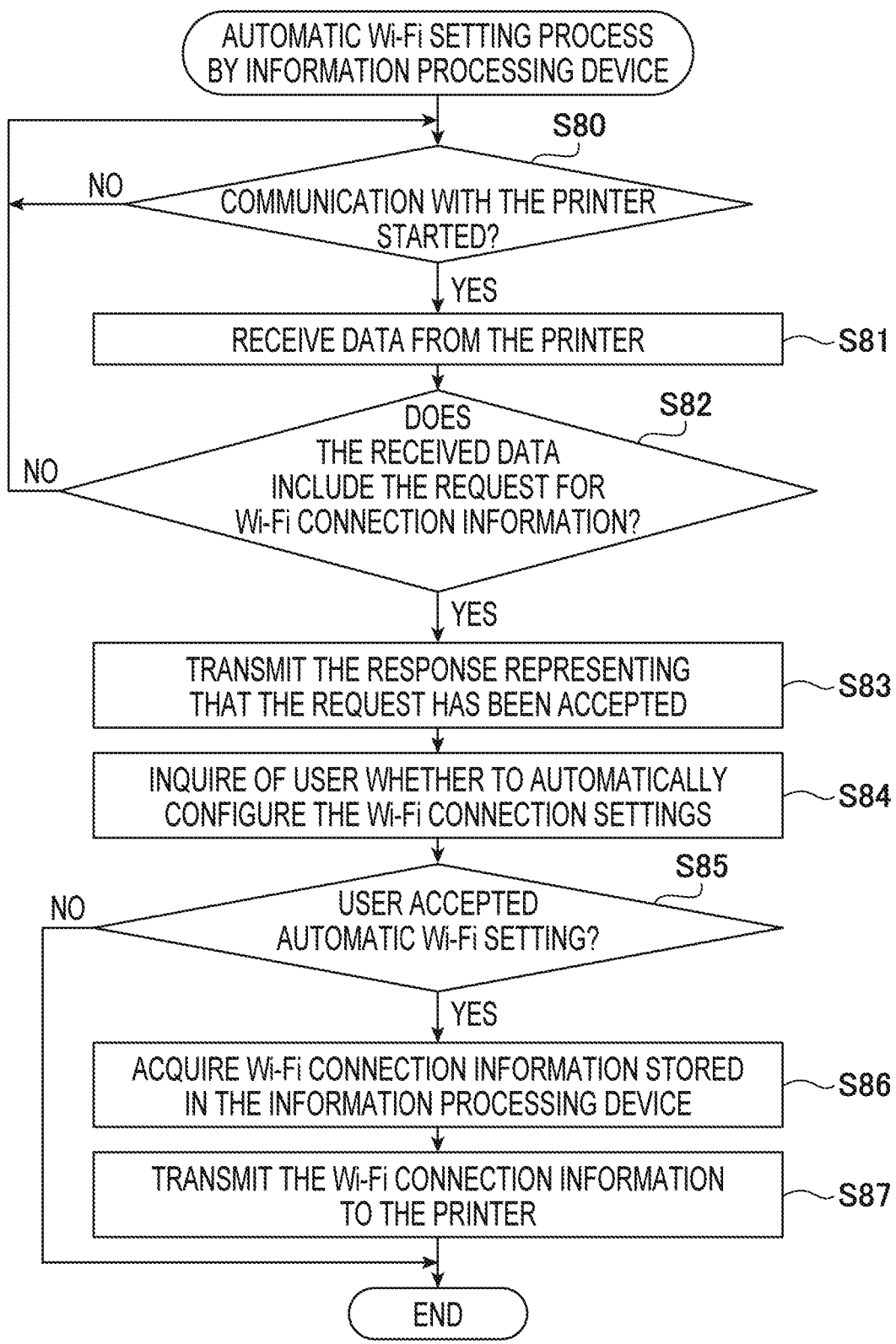
FIG. 6 is a flowchart showing a procedure of an automatic Wi-Fi setting process to be performed by the information processing device in the second illustrative embodiment according to one or more aspects of the present disclosure.
Figure 7:
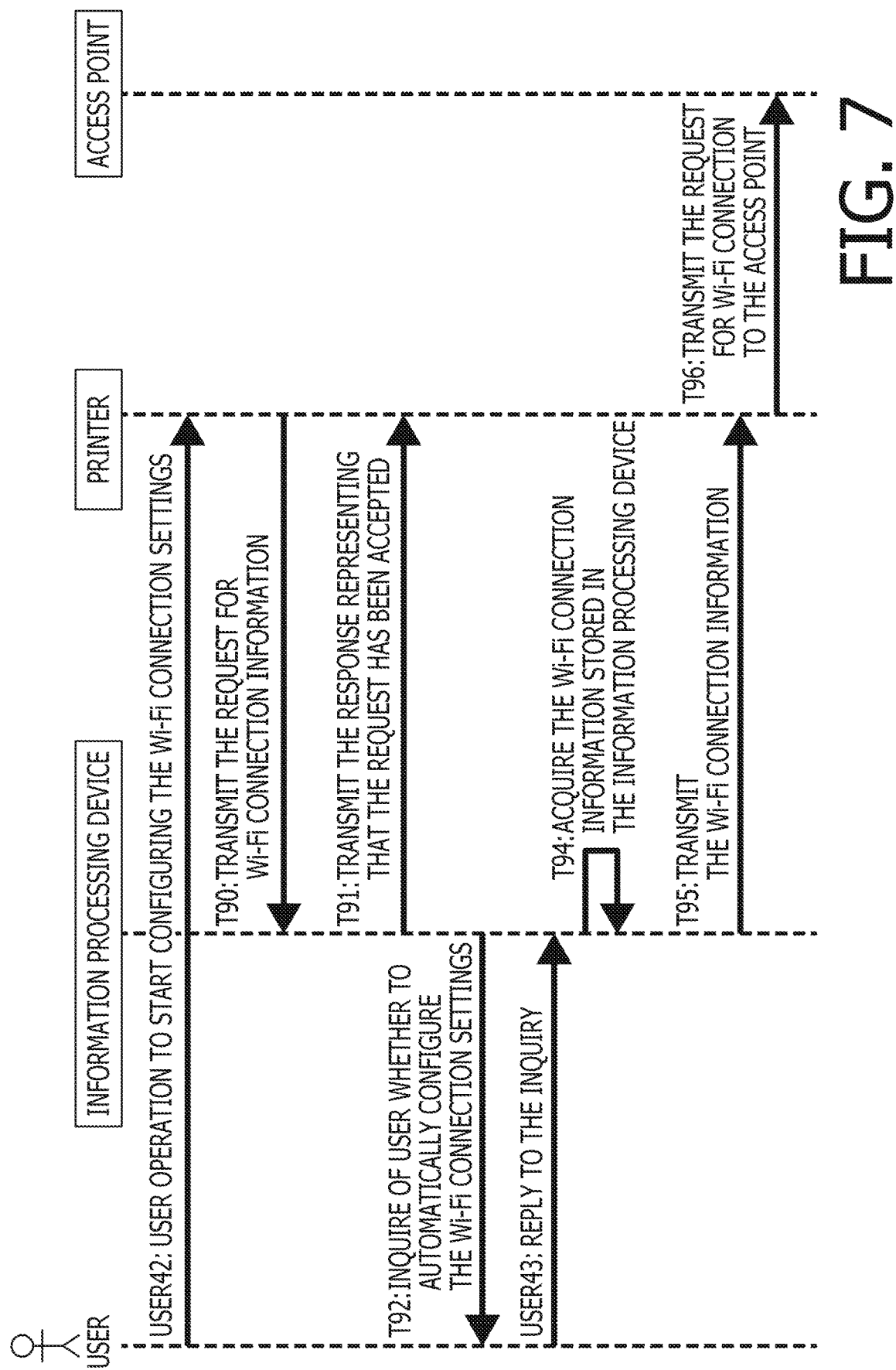
FIG. 7 is a sequence chart showing a specific procedure of an automatic Wi-Fi setting process in the printing system that is attained by the processes shown in FIGS. 5 and 6, in the second illustrative embodiment according to one or more aspects of the present disclosure.

Then, in T92, the CPU 21 inquires of the user whether to automatically configure the Wi-Fi connection settings for the printer 1 (FIG. 6, S84).

Next, in USER43, the user responds to the inquiry by touching the "Continue" button or the "Cancel" button on the user I/F 26.

Subsequently, in T94, when determining that the user has accepted the automatic configuration of the Wi-Fi connection settings for the printer 1 (FIG. 6, S85: Yes), the CPU 21 of the information processing device 2 acquires the Wi-Fi connection information stored in the information processing device 2 (FIG. 6, S86).

Then, in T95, the CPU 21 of the information processing device 2 transmits the acquired Wi-Fi connection information to the printer 1 (FIG. 6, S87).

Figure 5B:
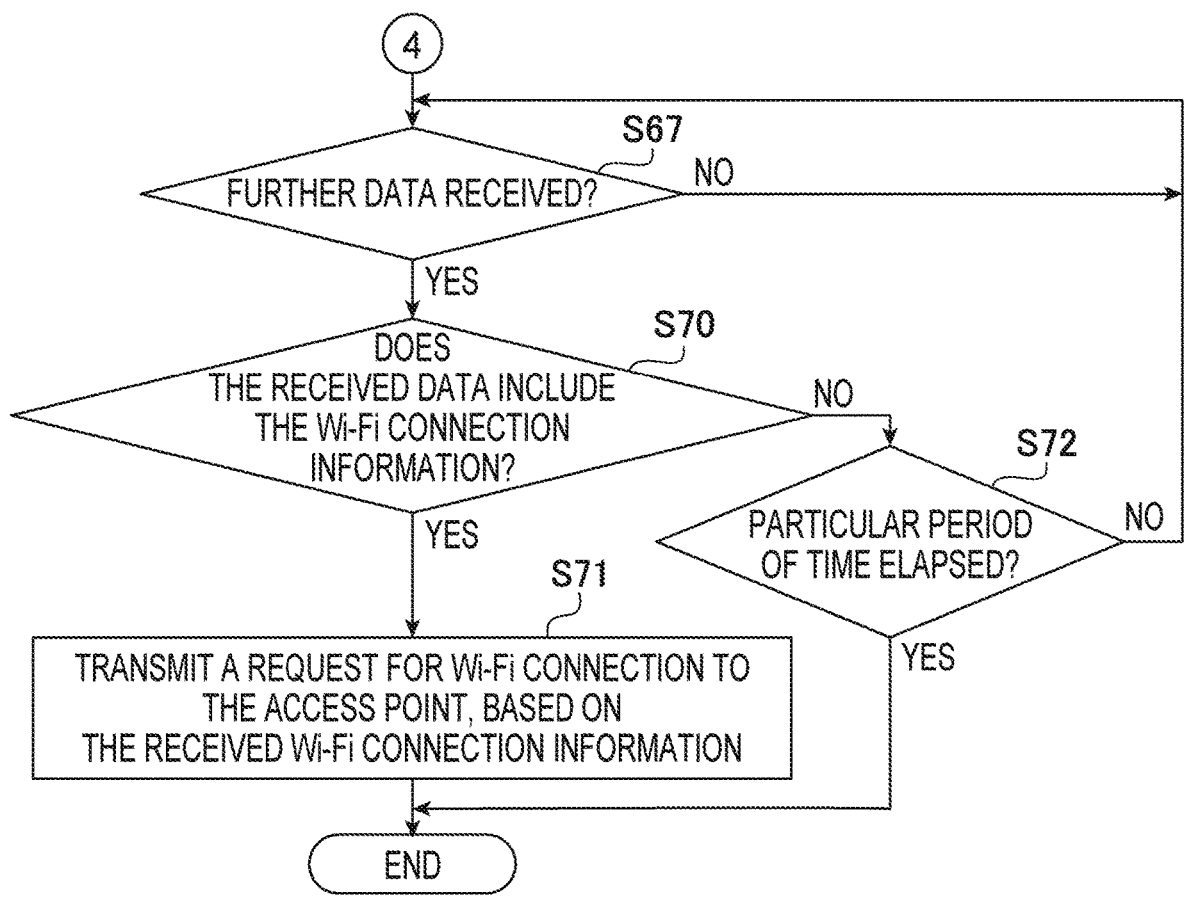

Next, in T96, the controller 11 of the printer 1 transmits a request for Wi-Fi connection to the access point 3 based on the received the Wi-Fi connection information (FIG. 5B, S71).

Thus, in the second illustrative embodiment, in response to the user performing via the operation I/F 13 an operation to start configuring the Wi-Fi connection settings, the automatic Wi-Fi setting process shown in FIG. 7 is started. In that process shown in FIG. 7, when the printer 1 and the OS44 of the information processing device 2 comply with the particular setting protocol, the Wi-Fi connection information for performing communication between the printer 1 and the information processing device 2 via the commonly-used access point 3 is transferred from the information processing device 2 to the printer 1 via the BLE communication. Hence, with no need to install an application program specific for communication setting into the information processing device 2, by using the function of the OS 44, it is possible to cause the printer 1 to automatically configure the Wi-Fi connection settings. Thus, according to the second illustrative embodiment, a user-friendly technology is provided to reduce troublesome operations for communication setting.

Third Illustrative Embodiment

A third illustrative embodiment according to aspects of the present disclosure will be described below with reference to the accompanying drawings. In the third illustrative embodiment, aspects of the present disclosure are applied to a printing system including an image forming apparatus and an information processing device that are communicably interconnected. In the following description, substantially the same elements as exemplified in the first illustrative embodiment and/or the second illustrative embodiment may be provided with the same reference characters.

In the aforementioned second illustrative embodiment, in response to the user performing via the operation I/F 13 an operation to start configuring the Wi-Fi connection settings, the controller 11 transmits a request for Wi-Fi connection information for configuring the Wi-Fi connection settings to the information processing device 2, in S63 in FIG. 5A.

Figure 8A:
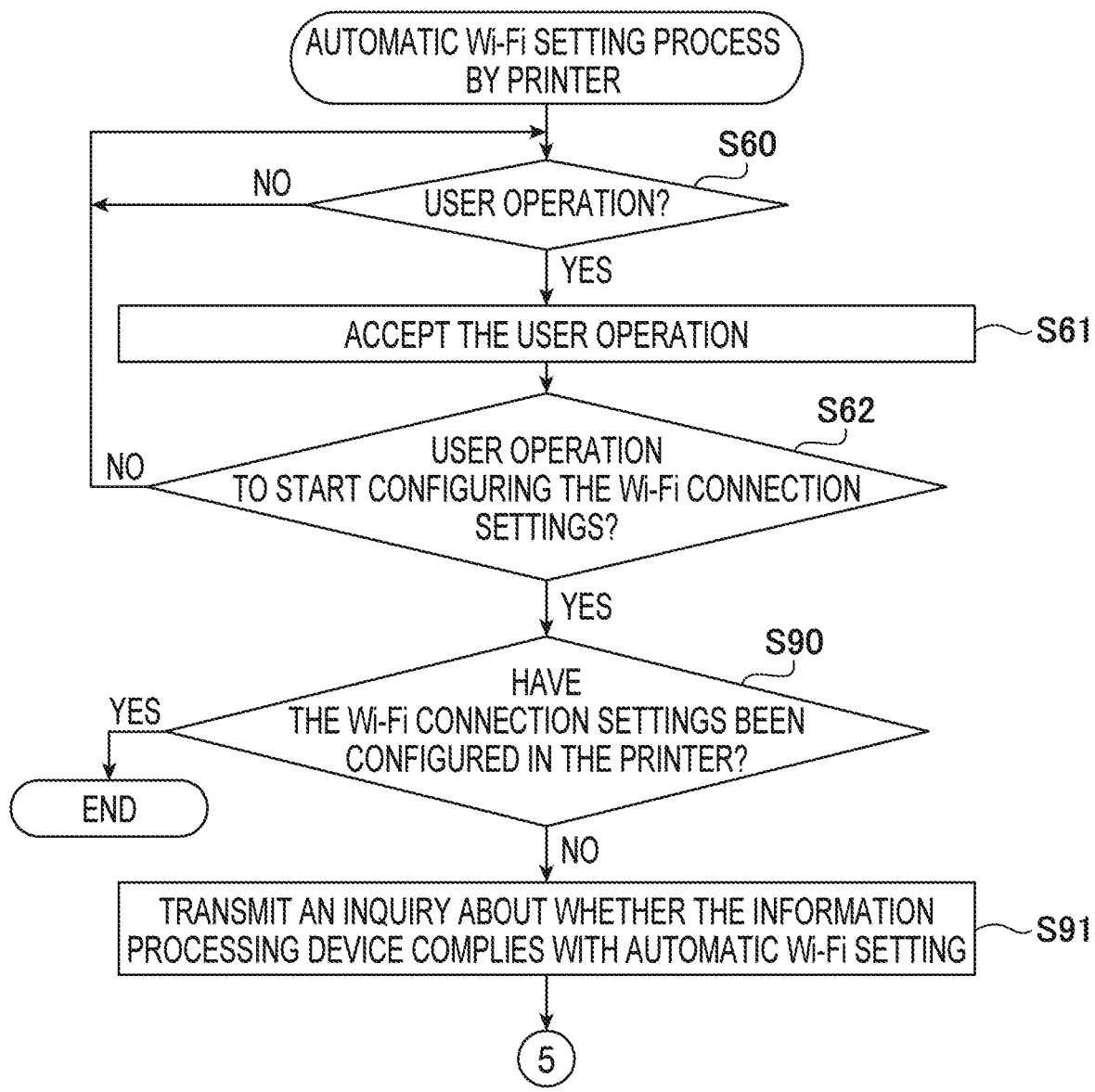
FIGS. 8A and 8B are flowcharts showing a procedure of an automatic Wi-Fi setting process to be performed by the printer in a third illustrative embodiment according to one or more aspects of the present disclosure.
Figure 8B:
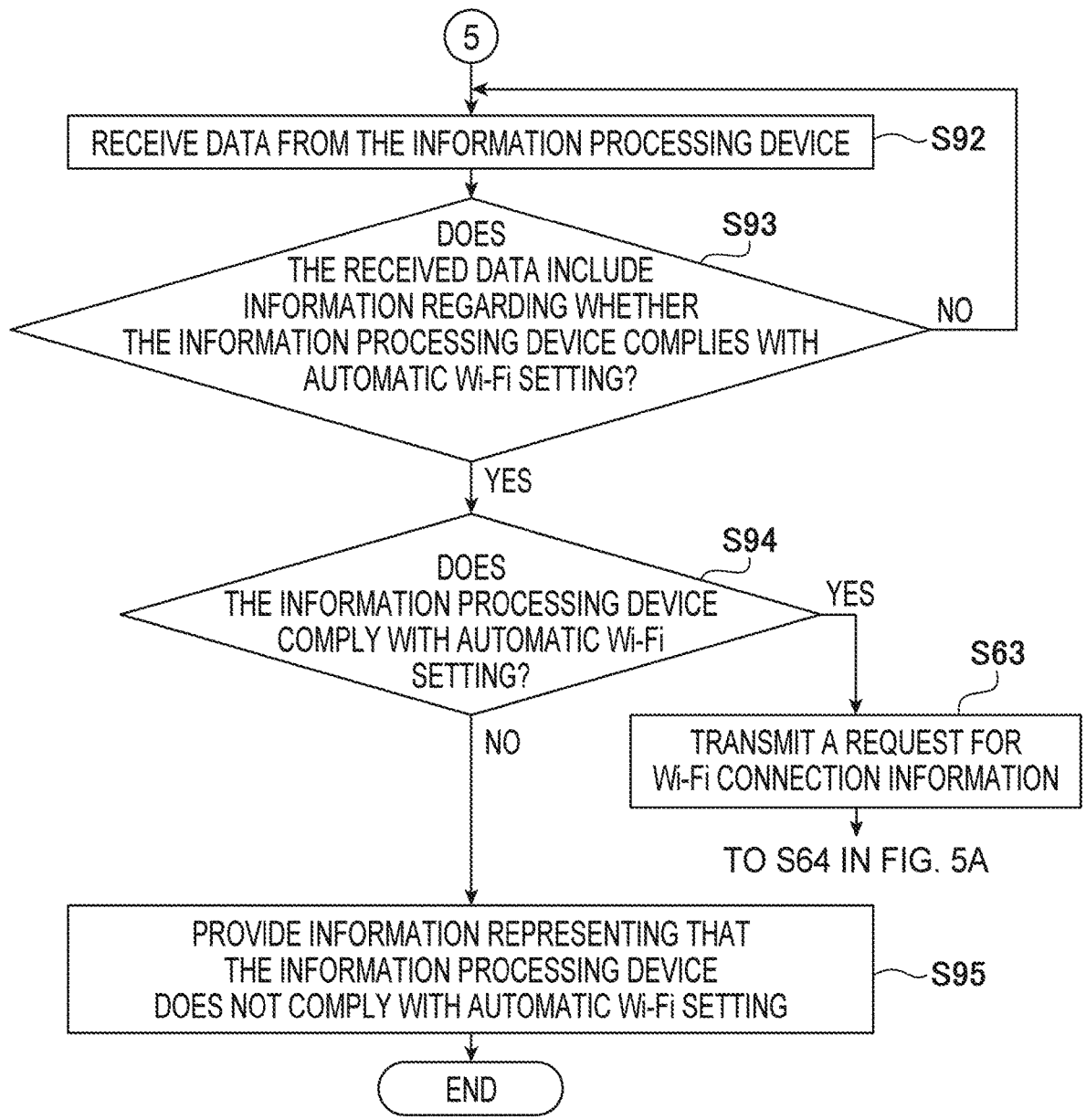

In contrast, the third illustrative embodiment is different from the second illustrative embodiment in that in response to the user performing via the operation I/F 13 an operation to start configuring the Wi-Fi connection settings, the controller 11, after making some determinations, transmits a request for the Wi-Fi connection information to the information processing device 2. Hereinafter, referring to FIGS. 8A and 8B, an explanation will be provided of an automatic Wi-Fi setting process to be performed by the controller 11 of the printer 1. For instance, the automatic Wi-Fi setting process shown in FIGS. 8A and 8B may be performed by the CPU 50 executing one or more programs (e.g., the automatic setting program 55) stored in the flash ROM 52.

After accepting a user operation via the operation I/F 13 (S61), when determining that the accepted user operation is an operation to start configuring the Wi-Fi connection settings (S62: Yes), the controller 11 determines whether the Wi-Fi connection settings have been configured in the printer 1 (S90).

In the third illustrative embodiment, for instance, the controller 11 may determine in S90 whether the Wi-Fi connection settings have been configured in the printer 1, based on whether the Wi-Fi connection information (e.g., the SSID and/or the passphrase) is stored in a particular area of the flash ROM 52.

Then, when determining that the Wi-Fi connection settings have been configured in the printer 1 (S90: Yes), the controller 11 terminates the automatic Wi-Fi setting process shown in FIGS. 8A and 8B.

Meanwhile, when determining that the Wi-Fi connection settings have not been configured in the printer 1 (S90: No), the controller 11 transmits an inquiry about whether the information processing device 2 complies with the automatic Wi-Fi setting (i.e., whether the OS 44 of the information processing device 2 complies with the particular setting protocol), to the information processing device 2 via the BLE I/F 16 (S91). Afterward, the controller 11 goes to S92.

After receiving data from the information processing device 2 (S92), the controller 11 determines whether the received data includes information regarding whether the information processing device 2 complies with the automatic Wi-Fi setting (S93). When determining that the received data includes information regarding whether the information processing device 2 complies with the automatic Wi-Fi setting (S93: Yes), the controller 11 goes to S94.

Meanwhile, when determining that the received data does not include information regarding whether the information processing device 2 complies with the automatic Wi-Fi setting (S93: No), the controller 11 goes back to S92 and again receives data from the information processing device 2 via the BLE I/F 16.

In S94, the controller 11 determines whether the information processing device 2 complies with the automatic Wi-Fi setting, based on the data received in S92. In this case, for instance, the data received in S92 may include information directly representing that the information processing device 2 complies with the automatic Wi-Fi setting, or may include information (e.g., information regarding a version of the OS 44) implicitly representing that the information processing device 2 complies with the automatic Wi-Fi setting.

When determining that the information processing device 2 complies with the automatic Wi-Fi setting (S94: Yes), the controller 11 goes to S63. Afterward, the controller 11 executes S63 and the following steps (e.g., S64 to S72) as shown in FIGS. 5A and 5B.

Meanwhile, when determining that the information processing device 2 does not comply with the automatic Wi-Fi setting (S94: No), the controller 11 displays, on the operation I/F 13, information representing that the information processing device 2 does not have the automatic Wi-Fi setting function (S95). Thereafter, the controller 11 terminates the automatic Wi-Fi setting process shown in FIGS. 8A and 8B.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, the following modifications according to aspects of the present disclosure are feasible.

Instead of the non-volatile memory 24, the information processing device 2 may include any type of large capacity storage device.

In the aforementioned first and second illustrative embodiments, in S21 (see FIG. 2B) and S86 (see FIG. 6), the CPU 21 acquires the Wi-Fi connection information stored in the non-volatile memory 24. Nonetheless, for instance, on the occasion when the CPU 21 inquires of the user whether to automatically configure the Wi-Fi connection settings in S19 (see FIG. 2B) or S84 (see FIG. 6), the CPU 21 may prompt the user to input the Wi-Fi connection information, thereby acquiring the Wi-Fi connection information.

Further, in the aforementioned first illustrative embodiment, as shown in FIG. 4, in T52, the CPU 21 of the information processing device 2 transmits, to the printer 1, the inquiry about whether the Wi-Fi connection settings have been configured in the printer 1 (FIG. 2B, S15). Subsequently, in T53, in response to the inquiry received from the information processing device 2 in T52, the controller 11 of the printer 1 transmits the information regarding whether the Wi-Fi connection settings have been configured in the printer 1, to the information processing device 2 (FIG. 3A, S35). Nonetheless, T52 and T53 may be omitted.

In this case, when the Wi-Fi connection settings have been configured in the printer 1, in T57, the controller 11 of the printer 1 may neither store the received Wi-Fi connection information into the flash ROM 52 nor transmit the request for Wi-Fi connection to the access point 3.

Further, in the aforementioned first illustrative embodiment, in S11 (see FIG. 2A), in response to the printer 1 being connected with the information processing device 2 via the USB cable 4, the CPU 21 transmits to the printer 1 the inquiry about whether the printer 1 complies with the automatic Wi-Fi setting. Nonetheless, the CPU 21 may transmit to the printer 1 the inquiry about whether the printer 1 complies with the automatic Wi-Fi setting, at arbitrary timing convenient to the user.

Further, each process/operation as exemplified in the aforementioned illustrative embodiments may be performed by one or more CPUs, one or more hardware elements such as ASICs, or a combination including at least two of CPUs and hardware elements such as ASICs. Moreover, each process/operation as exemplified in the aforementioned illustrative embodiments may be performed in accordance with a processor-implementable method or computer-readable instructions stored in a non-transitory computer-readable medium.

Associations between elements exemplified in the aforementioned illustrative embodiments and elements according to aspects of the present disclosure will be exemplified below. The printer 1 may be an example of an "image processing apparatus" according to aspects of the present disclosure. The information processing device 2 may be an example of an "information processing device" according to aspects of the present disclosure. The network I/F 14 may be an example of a "first communication interface" according to aspects of the present disclosure. The USB I/F 15 and the BLE I/F 16 may be included in examples of a "second communication interface" according to aspects of the present disclosure. The controller 11 may be an example of a "controller" according to aspects of the present disclosure. The CPU 50 and the flash ROM 52 storing programs (e.g., the automatic setting program 55) may be included in the "controller" according to aspects of the present disclosure. The Wi-Fi connection information (e.g., the Wi-Fi SSID and the passphrase) may be an example of "setting information for a first communication system" according to aspects of the present disclosure.

What is claimed is:

1. A printing apparatus comprising:
a first communication interface configured to perform communication in a first communication system;
a second communication interface configured to perform communication in a second communication system different from the first communication system; and
a controller configured to perform a setting process to establish a connection with an information processing device via the first communication interface, wherein the printing apparatus complies with a particular setting protocol including a procedure to receive setting information for the first communication system originally from an OS of the information processing device, the setting process comprising:
receiving first compliance information from the information processing device via the second communication interface, the first compliance information representing that the OS of the information processing device complies with the particular setting protocol;
transmitting second compliance information to the information processing device via the second communication interface, the second compliance information representing that the printing apparatus complies with the particular setting protocol;
after sharing mutual compliance recognition with the information processing device through receiving the first compliance information and transmitting the second compliance information, receiving the setting information originally from the OS of the information processing device via the second communication interface in accordance with the particular setting protocol, the shared mutual compliance recognition causing both the printing apparatus and the information processing apparatus to recognize that both the printing apparatus and the OS of the information processing device comply with the particular setting protocol; and
based on the setting information received originally from the OS of the information processing device, configuring settings for the first communication system.

2. The printing apparatus according to claim 1,
wherein the setting process further comprises:
receiving a particular inquiry about whether the printing apparatus complies with the particular setting protocol, from the information processing device via the second communication interface;
in response to the particular inquiry received from the information processing device, transmitting the second compliance information representing that the printing apparatus complies with the particular setting protocol, to the information processing device via the second communication interface; and
after transmitting the second compliance information, receiving the setting information for the first communication system originally from the OS of the information processing device via the second communication interface in accordance with the particular setting protocol.

3. The printing apparatus according to claim 2,
wherein the particular inquiry is transmitted by the information processing device each time the information processing device detects that the information processing device has become communicably connected with the printing apparatus in the second communication system.

4. The printing apparatus according to claim 2,
wherein the particular inquiry is transmitted by the information processing device when the information processing device first detects that the information processing device has become communicably connected with the printing apparatus in the second communication system.

5. The printing apparatus according to claim 1,
wherein the setting process further comprises:
receiving a specific inquiry about whether the settings for the first communication system have been configured in the printing apparatus, from the information processing device via the second communication interface, the specific inquiry being transmitted in accordance with an instruction originally from the OS of the information processing device;
in response to the specific inquiry received from the information processing device, transmitting current setting information to the information processing device via the second communication interface, the current setting information regarding whether the settings for the first communication system have been configured in the printing apparatus; and
after transmitting the second compliance information and the current setting information representing that the settings for the first communication system have been configured in the printing apparatus, receiving the setting information for the first communication system originally from the OS of the information processing device via the second communication interface in accordance with the particular setting protocol.

6. The printing apparatus according to claim 1,
wherein the setting information received originally from the OS of the information processing device is information stored in a memory of the information processing device when the information processing device performed communication in the first communication system.

7. The printing apparatus according to claim 1,
wherein the setting process further comprises:
transmitting an inquiry about whether the OS of the information processing device complies with the particular setting protocol, to the information processing device via the second communication interface;
in response to transmitting the inquiry, receiving the first compliance information regarding whether the OS of the information processing device complies with the particular setting protocol, from the information processing device via the second communication interface;
when the received first compliance information represents that the OS of the information processing device complies with the particular setting protocol, transmitting a request for the setting information for the first communication system, to the information processing device via the second communication interface, the request for the setting information including the second compliance information representing that the printing apparatus complies with the particular setting protocol; and in response to transmitting the request for the setting information with the second compliance information included therein, receiving the setting information originally from the OS of the information processing device via the second communication interface in accordance with the particular setting protocol.

8. The printing apparatus according to claim 1,
wherein the controller comprises:
a processor; and
a memory storing processor-executable instructions configured to, when executed by the processor, cause the processor to perform the setting process.

9. The printing apparatus according to claim 1,
wherein the first communication interface is a Wi-Fi interface, and
wherein the second communication interface is a USB interface.

10. The printing apparatus according to claim 1, wherein the OS is a driver-less OS.

11. The printing apparatus according to claim 1,
wherein the first communication interface is a Wi-Fi interface, and
wherein the second communication interface is a BLE interface.

12. A printing apparatus comprising:
a first communication interface configured to perform communication in a first communication system;
a second communication interface configured to perform communication in a second communication system different from the first communication system; and
a controller configured to perform a setting process to establish a connection with an information processing device via the first communication interface; wherein the printing apparatus complies with a particular setting protocol including a procedure to receive setting information for the first communication system originally from an OS of the information processing device; the setting process comprising:
transmitting a request for setting information for the first communication system, to the information processing device via the second communication interface after receiving first compliance information from the information processing device via the second communication interface, the first compliance information representing that the OS of the information processing device complies with the particular setting protocol;
in response to transmitting the request for the setting information, receiving the setting information originally from the OS of the information processing device via the second communication interface in accordance with the particular setting protocol; and
based on the setting information received originally from the OS of the information processing device, configuring the settings for the first communication system.

13. The printing apparatus according to claim 12,
wherein the setting process further comprises:
transmitting an inquiry about whether the OS of the information processing device complies with the particular setting protocol, to the information processing device via the second communication interface; and
in response to transmitting the inquiry, receiving the first compliance information regarding whether the OS of the information processing device complies with the particular setting protocol, from the information processing device via the second communication interface.

14. The printing apparatus according to claim 12,
wherein the setting process further comprises:
when the settings for the first communication system have not been configured in the printing apparatus, transmitting the request for the setting information for the first communication system, to the information processing device via the second communication interface.

15. The printing apparatus according to claim 12,
wherein the setting information received originally from the OS of the information processing device is information stored in a memory of the information processing device when the information processing device performed communication in the first communication system.

16. The printing apparatus according to claim 12,
wherein the request for the setting information includes second compliance information representing that the printing apparatus complies with the particular setting protocol.

17. The printing apparatus according to claim 12, wherein the controller comprises:
a processor; and
a memory storing processor-executable instructions configured to, when executed by the processor, cause the processor to perform the setting process.

18. The printing apparatus according to claim 12,
wherein the first communication interface is a Wi-Fi interface, and
wherein the second communication interface is a USB interface.

19. The processing printing apparatus according to claim 12,
wherein the first communication interface is a Wi-Fi interface, and
wherein the second communication interface is a BLE interface.

20. A method implementable on a controller of a printing apparatus comprising a first communication interface configured to perform communication in a first communication system, and a second communication interface configured to perform communication in a second communication system different from the first communication system, wherein the printing apparatus complies with a particular setting protocol including a procedure to receive setting information for the first communication system originally from an OS of an information processing device, the method comprising:
receiving first compliance information from the information processing device via the second communication interface, the first compliance information representing that the OS of the information processing device complies with the particular setting protocol;
transmitting second compliance information to the information processing device via the second communication interface, the second compliance information representing that the printing apparatus complies with the particular setting protocol;
after sharing mutual compliance recognition with the information processing device through receiving the first compliance information and transmitting the second compliance information, receiving the setting information originally from the OS of the information processing device via the second communication interface in accordance with the particular setting protocol, the shared mutual compliance recognition causing both the printing apparatus and the information processing device to recognize that both the printing apparatus and the OS of the information processing device comply with the particular setting protocol; and based on the setting information originally received from the OS of the information processing device, configuring settings for the first communication system.

\* \* \* \* \*